United States Patent
Uotsu

(10) Patent No.: US 10,228,454 B2
(45) Date of Patent: Mar. 12, 2019

(54) OBSTACLE DETECTION DEVICE FOR WORK MACHINE

(71) Applicant: Hitachi Construction Machinery Co., Ltd., Tokyo (JP)

(72) Inventor: Shinichi Uotsu, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 371 days.

(21) Appl. No.: 14/917,031

(22) PCT Filed: Jan. 15, 2015

(86) PCT No.: PCT/JP2015/050961
§ 371 (c)(1),
(2) Date: Mar. 7, 2016

(87) PCT Pub. No.: WO2015/125523
PCT Pub. Date: Aug. 27, 2015

(65) Prior Publication Data
US 2016/0202351 A1   Jul. 14, 2016

(30) Foreign Application Priority Data
Feb. 18, 2014 (JP) .................. 2014-028783

(51) Int. Cl.
*G01S 13/04* (2006.01)
*G01S 13/86* (2006.01)
(Continued)

(52) U.S. Cl.
CPC ............ *G01S 13/04* (2013.01); *G01S 13/867* (2013.01); *G01S 13/931* (2013.01);
(Continued)

(58) Field of Classification Search
CPC ...... G01S 13/04; G01S 13/867; G01S 13/931; G06K 9/00805; G08G 1/166; H04N 7/18
(Continued)

(56) References Cited

U.S. PATENT DOCUMENTS

2004/0001019 A1   1/2004   Nakazawa et al.
2004/0164892 A1*  8/2004   Shinoda ............. G01S 13/4463
                                                     342/107

FOREIGN PATENT DOCUMENTS

JP   2003-329773 A   11/2003
JP   2008-111728 A   5/2008
(Continued)

OTHER PUBLICATIONS

International Search Report of PCT/JP2015/050961 dated Mar. 24, 2015.

*Primary Examiner* — Timothy A Brainard
(74) *Attorney, Agent, or Firm* — Mattingly & Malur, PC

(57) ABSTRACT

Provided is an obstacle detection device for a work machine which can detect an obstacle coming close to a vehicle accurately regardless of vehicle speed. In the present invention, an obstacle detection device 10 for a dump truck 1 which detects an obstacle coming close to the vehicle includes: a periphery monitoring unit 11 for detecting an obstacle in the area around the vehicle and monitoring the area around the vehicle; a distant monitoring unit 12 for detecting an obstacle in a more distant place from the vehicle than the detection range of the periphery monitoring unit 11 and monitor a distant area from the vehicle; and a monitoring switching unit 13 for switching between monitoring by the periphery monitoring unit 11 and monitoring by the distant monitoring unit 12.

3 Claims, 11 Drawing Sheets

(51) Int. Cl.
  *G01S 13/93*    (2006.01)
  *G06K 9/00*     (2006.01)
  *G08G 1/16*     (2006.01)
  *H04N 7/18*     (2006.01)

(52) U.S. Cl.
  CPC ......... *G06K 9/00805* (2013.01); *G08G 1/166* (2013.01); *G01S 2013/9375* (2013.01); *G01S 2013/9389* (2013.01); *H04N 7/18* (2013.01)

(58) Field of Classification Search
  USPC .......................................................... 342/27
  See application file for complete search history.

(56) References Cited

FOREIGN PATENT DOCUMENTS

| | | |
|---|---|---|
| JP | 2011-009823 A | 1/2011 |
| JP | 2012-074929 A | 4/2012 |
| JP | 2012-227699 A | 11/2012 |
| JP | 2012-256113 A | 12/2012 |

* cited by examiner

| TRAVEL STATE | PERIPHERY MONITORING FUNCTION | DISTANT MONITORING FUNCTION |
|---|---|---|
| FORWARD HIGH SPEED TRAVEL | OFF | ON |
| FORWARD LOW SPEED TRAVEL | ON | OFF |
| STOP | ON | OFF |
| BACKWARD TRAVEL | ON | OFF |

FIG. 9A

| TRAVEL STATE | PERIPHERY MONITORING FUNCTION | | | | DISTANT MONITORING FUNCTION |
|---|---|---|---|---|---|
| | FORWARD | LEFT | BACKWARD | RIGHT | |
| FORWARD HIGH SPEED TRAVEL | OFF | ON | ON | ON | ON |
| FORWARD LOW SPEED TRAVEL | ON | ON | ON | ON | OFF |
| STOP | ON | ON | ON | ON | OFF |
| BACKWARD TRAVEL | ON | ON | ON | ON | OFF |

FIG. 9B

| TRAVEL STATE | PERIPHERY MONITORING FUNCTION | | | | DISTANT MONITORING FUNCTION |
|---|---|---|---|---|---|
| | FORWARD | LEFT | BACKWARD | RIGHT | |
| LEFT HIGH SPEED TRAVEL | OFF | ON | ON | OFF | ON |
| RIGHT HIGH SPEED TRAVEL | OFF | OFF | ON | ON | ON |

OBSTACLE DETECTION DEVICE FOR WORK MACHINE

TECHNICAL FIELD

The present invention relates to an obstacle detection device for a work machine which detects an obstacle coming close to a vehicle.

BACKGROUND ART

In the past, work machines such as dump trucks and hydraulic excavators have been equipped with a periphery obstacle detection device which detects an obstacle around a vehicle in order to prevent contact of the vehicle with the obstacle around it because the field of view of an operator in the cab in the area around the vehicle is limited for a structural reason, etc. Consequently, if an obstacle comes in the detection range of the periphery obstacle detection device, the periphery obstacle detection device detects the obstacle and the operator can know the existence of the obstacle around the vehicle and thus the operator can operate the work machine safely.

On the other hand, this kind of periphery obstacle detection device should generally cover a wide area before and behind the vehicle and left and right of it or all around it in order to eliminate blind spots and thus it is necessary to take means to set a wide angle for the obstacle detection range, so the distance in which obstacles can be detected tends to be short. For this reason, when the vehicle is accelerated and runs at high speed, even if the periphery obstacle detection device detects an obstacle around the vehicle, it is difficult to determine the possibility of collision with the obstacle.

An obstacle sensing apparatus for a vehicle is known as one of the conventional techniques, which includes a radar apparatus for transmitting radio waves of a prescribed intensity to detect an obstacle ahead of the vehicle and an operating device controlling unit for controlling the operating device of the vehicle according to obstacle detection information from the radar apparatus (for example, see Patent Literature 1). The obstacle sensing apparatus for the vehicle in this conventional technique uses millimeter waves which are radio waves with a sufficient intensity to detect an obstacle and the range of obstacle detection by the millimeter waves is set with a narrower angle than that of the periphery obstacle detection device, so the distance in which obstacles can be detected by the apparatus is longer than by the periphery obstacle detection device, though the left-right width of the detection range per unit is limited. Therefore, the distance in which the periphery obstacle detection device can detect obstacles during high speed run of the vehicle may be supplemented by combining the periphery obstacle detection device with the obstacle sensing apparatus for the vehicle as the conventional technique.

CITATION LIST

Patent Literature

Patent Literature 1: Japanese Patent Application Laid-Open No. 2008-111728

SUMMARY OF INVENTION

Technical Problem

However, if the periphery obstacle detection device and the obstacle sensing apparatus for the vehicle as the conventional technique disclosed in PTL1 are simply combined and used at the same time, for example, an erroneous operation that a land surface irregularity which is essentially not an obstacle is detected as an obstacle may occur. In addition, since detection devices with different functions, namely detection of an obstacle around the vehicle and detection of an obstacle ahead of the vehicle by the radar apparatus, are activated, the frequency of obstacle detection increases additively and unnecessary operation which detects an obstacle less likely to cause collision may occur.

In particular, in many cases, detection of an obstacle around the vehicle by the periphery obstacle detection device is more needed when the vehicle transmits signals than when the vehicle runs steadily, so if even an obstacle which is unlikely to cause collision, such as an obstacle which does not exist in the traveling direction of a steadily running vehicle, is an object of detection, an alarm may be sounded frequently while the vehicle is running steadily and the operator may be compelled to deal with the situation unnecessarily, for example, by checking the area around the vehicle or stopping the alarm. Thus when the periphery obstacle detection device is used in combination with the obstacle sensing apparatus for the vehicle as the conventional technique, the problem arises that the above erroneous operation or unwanted operation occurs and thereby prevents smooth travel of the work machine.

The present invention has been made in view of the above circumstances of the conventional techniques and an object thereof is to provide an obstacle detection device for a work machine which can detect an obstacle coming close to a vehicle accurately regardless of vehicle speed.

Solution to Problem

In order to achieve the above object, an obstacle detection device for a work machine in the present invention is characterized in that an obstacle detection device for a work machine which detects an obstacle coming close to a vehicle includes: a periphery monitoring unit for detecting the obstacle in an area around the vehicle and monitoring the area around the vehicle; a distant monitoring unit for detecting the obstacle in a more distant place from the vehicle than the detection range of the periphery monitoring unit and monitoring a distant area from the vehicle; and a monitoring switching unit for switching between monitoring by the periphery monitoring unit and monitoring by the distant monitoring unit depending on the vehicle speed.

The present invention thus configured has two different functions, namely monitoring by the periphery monitoring unit and monitoring by the distant monitoring unit and can perform monitoring suitable for the travel condition of the vehicle by the monitoring switching unit performing switching between the monitoring functions depending on vehicle speed so that erroneous operation and unwanted operation as a result of using the periphery monitoring unit and distant monitoring unit simultaneously can be suppressed. Consequently, an obstacle coming close to the vehicle can be detected accurately regardless of vehicle speed.

Advantageous Effects of Invention

According to the obstacle detection device for a work machine in the present invention, even when monitoring by the periphery monitoring unit and monitoring by the distant monitoring unit are combined, the monitoring switching unit enables suitable monitoring for the vehicle speed can be performed through, so an obstacle coming close to the vehicle can be detected accurately regardless of the vehicle speed. Consequently, an obstacle detection device for a work machine which has higher reliability than before can be provided.

BRIEF DESCRIPTION OF DRAWINGS

FIG. 6 show views which explain the display screen of the monitor according to the first embodiment of the present invention, in which FIG. 6A shows that the monitoring function of the periphery monitoring unit is ON and the monitoring function of the distant monitoring unit is OFF and FIG. 6B shows that the monitoring function of the periphery monitoring unit is OFF and the monitoring function of the distant monitoring unit is ON.

FIG. 9 shows diagrams which explain the relation between the travel state of the dump truck according to the second embodiment of the present invention and the monitoring functions of the periphery monitoring unit and distant monitoring unit, in which FIG. 9A shows the relation when the dump truck travel states are a forward high speed travel state, forward low speed travel state, stop state and backward travel state and FIG. 9B shows the relation when the dump truck travel states are a left high speed travel state and right high speed travel state.

DESCRIPTION OF EMBODIMENTS

Next, embodiments of an obstacle detection device for a work machine according to the present invention will be described referring to drawings.

First Embodiment

Figure 1:
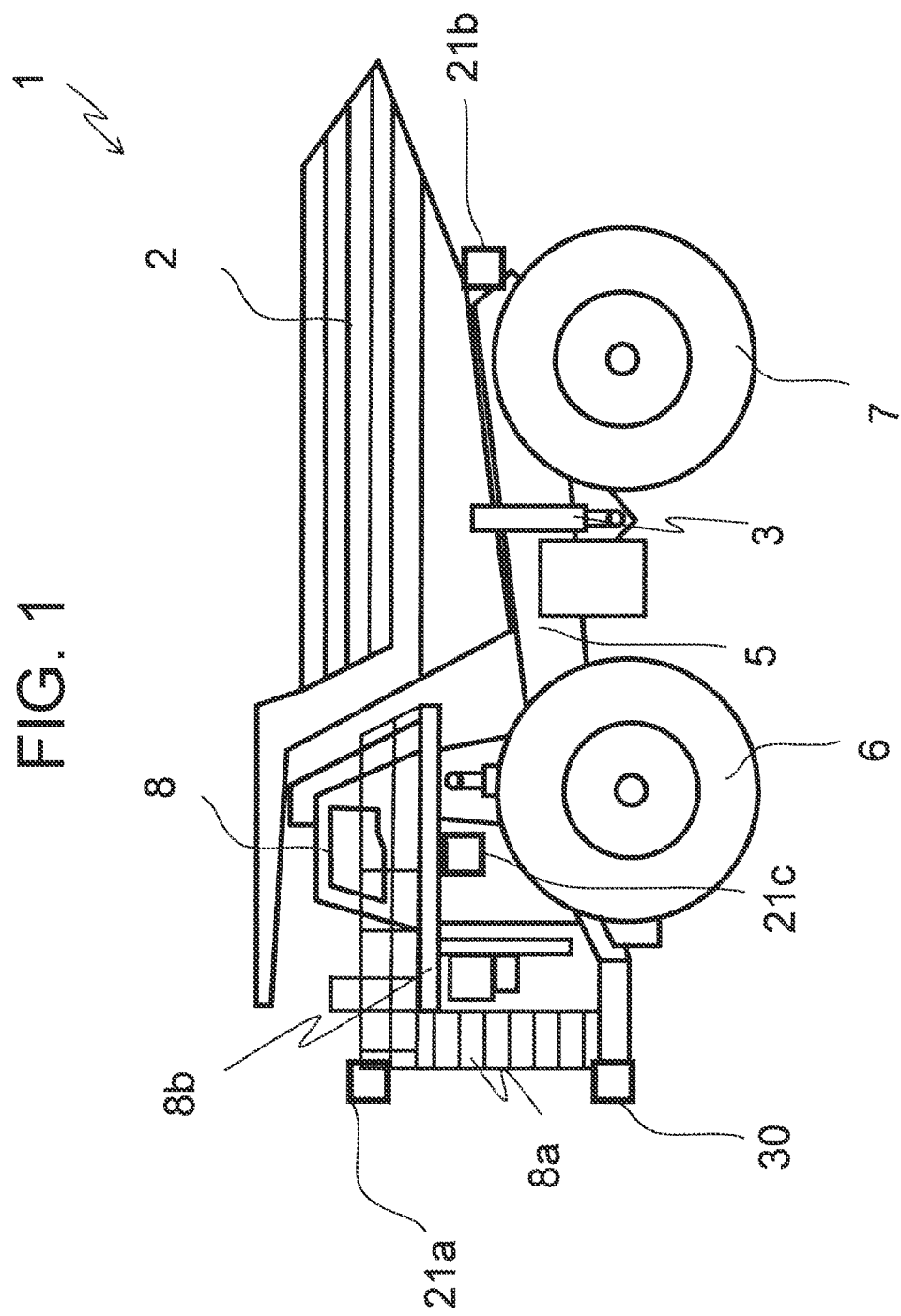
FIG. 1 is a view which shows the structure of a dump truck as an example of a work machine which is equipped with a first embodiment of an obstacle detection device according to the present invention.

An obstacle detection device 10 (see FIG. 2) according to the first embodiment of the present invention is provided in a work machine, for example a dump truck 1 shown in FIG. 1. In the description below, the directions of the area around the vehicle are expressed as four directions, "frontward", "backward", "left", and "right" and these directions are as viewed from an operator seated on the driver seat of a cab 8 which will be described later.

The dump truck 1 includes a vehicle frame 5, a front wheel 6 rotatably provided at each of the left and right ends of the front part of the vehicle frame 5, and two rear wheels 7 rotatably provided at each of the left and right ends of the rear part of the vehicle frame 5. The dump truck 1 further includes a vessel 2 which is mounted on the vehicle frame 5 in a derrickable manner and loads a cargo such as soil and crushed stone.

Specifically, the dump truck 1 has a hinge pin (not shown) provided on the rear part of the vehicle frame 5 and a hoist cylinder 3 which is located in a more forward position in the vehicle frame 5 than the hinge pin or between the front wheel 6 and rear wheel 7 and connects the vehicle frame 5 and the vessel 2, and when the hoist cylinder 3 is expanded, the vessel 2 is pushed up and erected, and when the hoist cylinder 3 is contracted, the vessel 2 is laid down while being supported.

Therefore, after the dump truck 1 carries the cargo such as soil and crushed stone loaded in the vessel 2 in the lying position, it changes the position of the vessel 2 from the lying position to the erect position to tilt the vessel 2 and unload the cargo. Though not shown, the dump truck 1 includes a hydraulic pump for supplying pressure oil to the hoist cylinder 3 and a hydraulic oil tank for storing the hydraulic oil to be supplied to the hydraulic pump so that the hoist cylinder 3 is expanded and contracted by the pressure oil supplied from the hydraulic pump.

The dump truck 1 further includes a built-in vehicle controller 9 (see FIG. 2) for controlling the movement of the vehicle and the abovementioned cab 8 located in front of the vessel 2 and provided on the front wheel 6 side of the vehicle frame 5, and the size of the front wheel 6 is larger than the size of the cab 8. Therefore, a step as a stepstool for the operator who operates the dump truck 1, for example, a ladder 8a, is installed on the front side of the cab 8 so that the operator can go up to the entrance of the cab 8 located above the front wheels 6. Though not shown, a vehicle speed sensor connected to the vehicle controller 9 to detect the speed of the vehicle is attached to the dump truck 1; and though not shown, inside the cab 8, a shift lever for shift into one of the shift positions, forward (F), neutral (N) and reverse (R), a steering handle for changing the vehicle traveling direction to the left or right by switching the steering direction of the front wheels 6, an accelerator pedal for accelerating the vehicle, and a brake pedal for giving a braking force to the rear wheels 7 are installed.

Thus, since the vehicle body of the dump truck 1 is large and for the operator inside the cab 8, the visibility of the area around the vehicle is easily limited, it is necessary to detect an obstacle coming close to the vehicle and monitor the area around the vehicle in order to avoid collision between the vehicle and the obstacle. Therefore, in order to assist the eyesight of the operator inside the cab 8 who operates the dump truck 1, as shown in FIG. 2, the obstacle detection device 10 according to the first embodiment of the present invention includes a periphery monitoring unit 11 which detects an obstacle around the vehicle and monitors the area around the vehicle, a distant monitoring unit 12 which detects an obstacle in a more distant place from the vehicle than the detection range of the periphery monitoring unit 11 and monitors a distant area from the vehicle, a monitoring switching unit 13 which performs switching between monitoring by the periphery monitoring unit 11 and monitoring by the distant monitoring unit 12 depending on the vehicle speed, and a reporting unit 14 which reports the result of monitoring by the periphery monitoring unit 11 or the distant monitoring unit 12 as selected by the monitoring switching unit 13, to the operator.

The periphery monitoring unit 11 includes, for example, four periphery monitoring cameras (hereinafter simply called cameras, for convenience) 21a to 21d which are provided on the vehicle in a manner to have different photographing ranges (see FIG. 1) to photograph the periphery of the vehicle, and a periphery monitoring controller 22 which controls the vehicle periphery monitoring operation according to the images taken by the cameras 21a to 21d.

Figure 3:
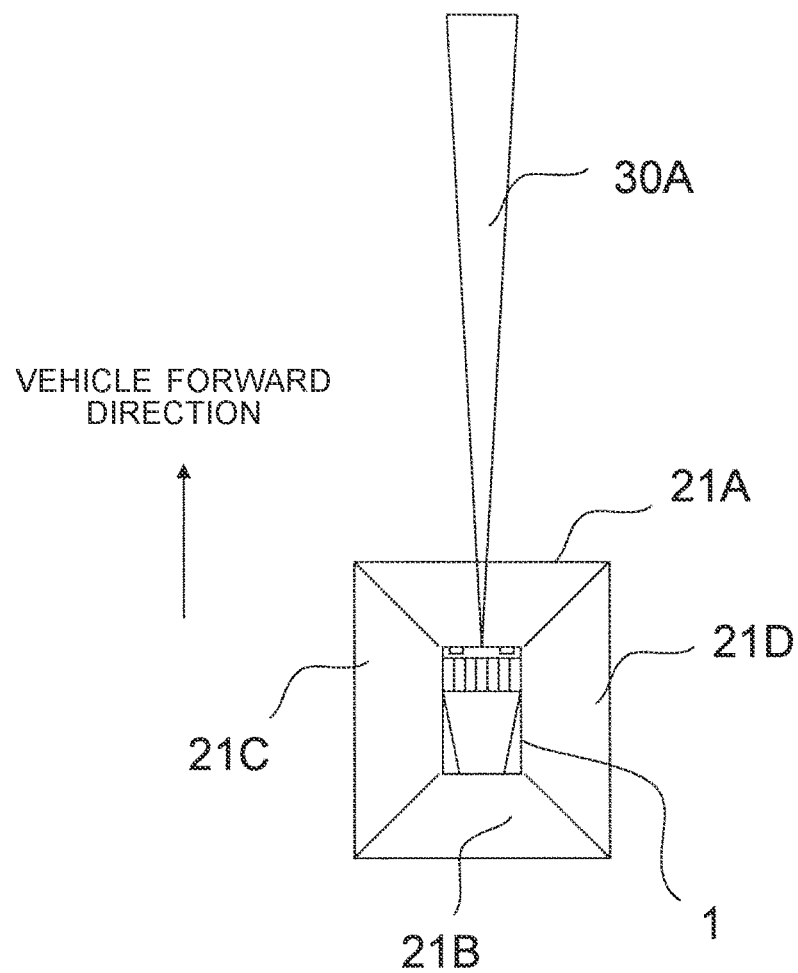
FIG. 3 is a plain view which shows the photographing ranges of periphery monitoring cameras and the detection range of a millimeter wave radar device for distant monitoring according to the first embodiment of the present invention.

As shown in FIG. 1, the camera 21a is attached to the upper frame of the ladder 8a on the front part of the vehicle to photograph a range 21A ahead of the vehicle (see FIG. 3) and the camera 21b is attached to the rear part of the vehicle frame 5 to photograph a range 21B behind the vehicle (see FIG. 3). The camera 21c is attached to the frame of a guide path 8b from the ladder 8a located above the front wheels 6 to the cab 8 to photograph a range 21C left of the vehicle (see FIG. 3) and the camera 21d is attached to the right side part of the cab 8 to photograph a range 21D right of the vehicle (see FIG. 3).

Figure 2:
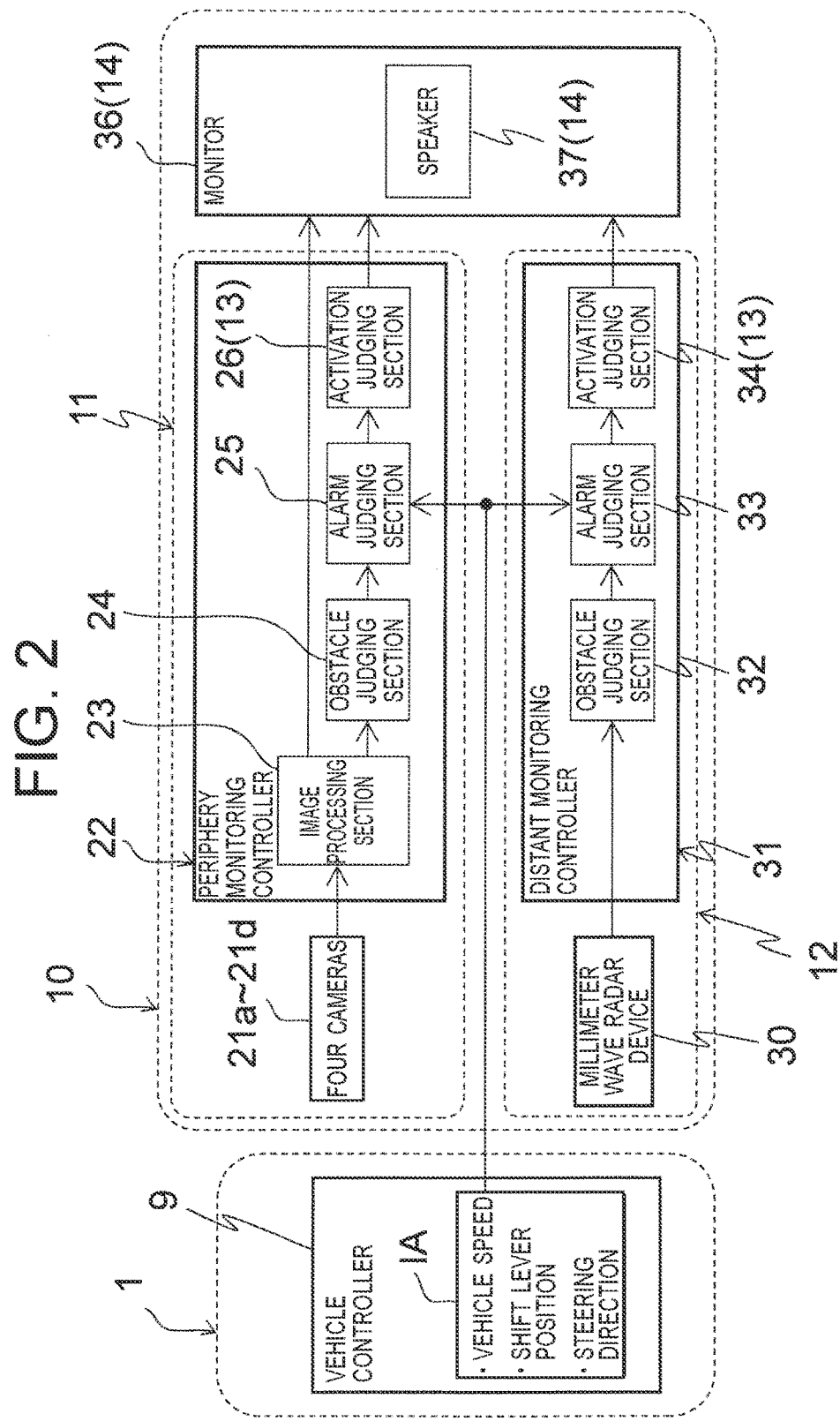
FIG. 2 is a block diagram which explains the configurations of the obstacle detection device and vehicle controller according to the first embodiment of the present invention.

As shown in FIG. 2, the periphery monitoring controller 22 includes an image processing section 23 which integrates the images taken by the cameras 21a to 21d into a single image, an obstacle judging section 24 which decides whether or not there is an obstacle, from an overhead-view image processed by the image processing section 23, an alarm judging section 25 which decides whether or not it is necessary to give an alarm (hereinafter called a periphery monitoring alarm, for convenience) about the existence of an obstacle around the vehicle according to the result of judgement by the obstacle judging section 24 and the vehicle information (vehicle speed, shift lever position, and steering direction) IA entered in the vehicle controller 9, and an activation judging section 26 which decides whether or not to activate a periphery monitoring alarm, depending on the result of judgement by the alarm judging section 25 and the vehicle speed.

The image processing section 23 integrates the images taken by the cameras 21a to 21d and processes them as an overhead-view image taken from above the vehicle. The obstacle judging section 24 uses the overhead-view image processed by the image processing section 23 and, for example, takes the difference between overhead-view images at two adjacent times, and if the number of pixels of the obtained image is a prescribed value or more, it decides that there is an obstacle around the vehicle and it measures the relative position and relative speed of the obstacle with respect to the dump truck 1 from the temporal change of raw images taken by the cameras 21a to 21d before integrating them into the overhead-view image. On the other hand, if the number of pixel's of the obtained image is smaller than the prescribed value, the obstacle judging section 24 decides that there is no obstacle around the vehicle.

When the existence of an obstacle around the vehicle is decided by the obstacle judging section 24, if the alarm judging section 25 decides that the vehicle is likely to collide with the obstacle, from the relative position and relative speed of the obstacle, and the vehicle speed, shift lever position and steering direction in the vehicle information IA, it decides that it is necessary to give a periphery monitoring alarm; if it decides that the vehicle is unlikely to collide with the obstacle, from the relative position and relative speed of the obstacle, and the vehicle speed, shift lever position and steering direction in the vehicle information IA, it decides that it is unnecessary to give a periphery monitoring alarm. The traveling direction of the vehicle is grasped from the shift lever position and the steering direction. Thus, a detailed judgement result can be obtained by using the vehicle information IA for judgment of the possibility of collision between the vehicle and obstacle by the alarm judging section 25.

The distant monitoring unit 12 includes a distant monitoring millimeter wave radar device (hereinafter called the millimeter wave radar device, for convenience) 30 which is attached, for example, to the lower frame of the ladder 8a, transmits millimeter band radio waves to ahead of the vehicle and receives the reflected waves to detect an object ahead, and a distant monitoring controller 31 which controls the operation of monitoring a distant area from the vehicle according to the result of detection by the millimeter wave radar device 30. As shown in FIG. 3, the millimeter wave radar device 30 transmits radio waves which reach a longer distance from the vehicle than the photographing range 21A of the camera 21a and detects an object in a range 30A extending ahead.

As shown in FIG. 2, the distant monitoring controller 31 includes an obstacle judging section 32 which decides whether or not the object detected by the millimeter wave radar device 30 interferes with the travel of the vehicle, an alarm judging section 33 which decides whether or not it is necessary to give an alarm (hereinafter called a distant monitoring alarm, for convenience) about the existence of an obstacle in a distant place from the vehicle according to the result of judgement by the obstacle judging section 32 and the vehicle information IA (vehicle speed, shift lever position, and steering direction) entered in the vehicle controller 9, and an activation judging section 34 which decides whether or not to activate a distant monitoring alarm, depending on the result of judgement by the alarm judging section 33 and the vehicle speed.

The obstacle judging section 32 measures the size of the object detected by, for example, the millimeter wave radar device 30 and if the size of the object is larger than a prescribed size, it decides that an obstacle exists in a distant place from the vehicle. The obstacle judging section 32 measures the relative position and relative speed of the obstacle with respect to the dump truck 1. On the other hand, if the size of the object detected by the millimeter wave radar device 30 is smaller than the prescribed size, the obstacle judging section 32 decides that there is no obstacle in a distant place from the vehicle.

When the existence of an obstacle in a distant place from the vehicle is decided by the obstacle judging section 32, if the alarm judging section 33 decides that the vehicle is likely to collide with the obstacle, from the relative position and relative speed of the obstacle, and the vehicle speed, shift lever position and steering direction in the vehicle information IA, it decides that it is necessary to give a distant monitoring alarm; if it decides that the vehicle is unlikely to collide with the obstacle, from the relative position and relative speed of the obstacle, and the vehicle speed, shift lever position and steering direction in the vehicle information IA, it decides that it is unnecessary to give a distant monitoring alarm. Thus, a detailed judgement result can be obtained by using the vehicle information IA for judgment of the possibility of collision between the vehicle and obstacle by the alarm judging sections 25 and 33.

The activation judging sections 26, 34 of the periphery monitoring controller 22 and distant monitoring controller 31 function as a monitoring switching unit 13; for example, if the vehicle is accelerated and its speed reaches a prescribed speed (for example, high speed of 50 m/s), the activation judging section 26 decides not to activate a periphery monitoring alarm and the activation judging section 34 decides to activate a distant monitoring alarm so that switching to monitoring by the distant monitoring unit 12 is made. On the other hand, if the vehicle is decelerated and its speed becomes lower than the prescribed speed, the activation judging section 26 decides to activate a periphery monitoring alarm and the activation judging section 34 decides not to activate a distant monitoring alarm so that switching to monitoring by the periphery monitoring unit 11 is made.

Figures 4, 5:
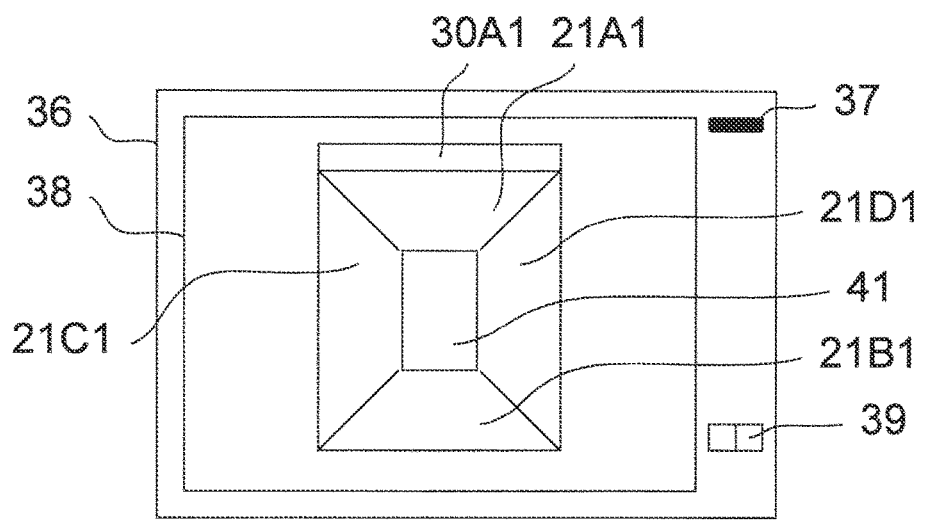
FIG. 4 is a diagram which explains the relation between the travel state of the dump truck according to the first embodiment of the present invention and the monitoring functions of a periphery monitoring unit and a distant monitoring unit.
FIG. 5 is a view which explains the structure of a monitor and speaker according to the first embodiment of the present invention and the display screen of the monitor.

Specifically, as shown in FIG. 4, when the vehicle travel state is the state of forward travel at the prescribed speed or higher (forward high speed travel state), the monitoring function of the periphery monitoring unit 11 is OFF and the monitoring function of the distant monitoring unit 12 is ON and when the vehicle travel state is the state of forward travel at a lower speed than the prescribed speed (forward low speed travel state), the monitoring function of the periphery monitoring unit 11 is ON and the monitoring function of the distant monitoring unit 12 is OFF. When the vehicle travel state is the state in which the vehicle stops (stop state), the monitoring function of the periphery monitoring unit 11 is ON and the monitoring function of the distant monitoring unit 12 is OFF and when the vehicle travel state is the state in which the vehicle moves backward (backward travel state), the monitoring function of the periphery monitoring unit 11 is ON and the monitoring function of the distant monitoring unit 12 is OFF.

For example, as shown in FIG. 5, the reporting unit 14 includes a monitor 36 installed inside the cab 8 and a speaker 37 which is mounted on the right top of the monitor 36 and generates a periphery monitoring alarm and a distant monitoring alarm by sound. The monitor 36 has a display 38 which shows, for example, an overhead-view image processed by the image processing section 23 and a periphery monitoring alarm and a distant monitoring alarm, and a power switch 39 which turns ON or OFF the power to the display 38 and the speaker 37.

The overhead-view image shown on the display 38 of the monitor 36 includes: for example, a display area 41 indicating the position of the vehicle as a center area; display areas 21A1 to 21D1 corresponding to the photographing ranges 21A to 21D of the cameras 21a to 21d (see FIG. 3); and a display area 30A1 indicating the area corresponding to the detection range 30A of the millimeter wave radar device 30 in a simplified form.

Figure 6A:
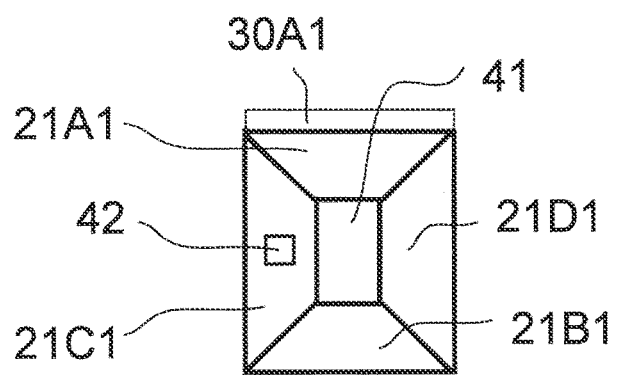
Figure 6B:
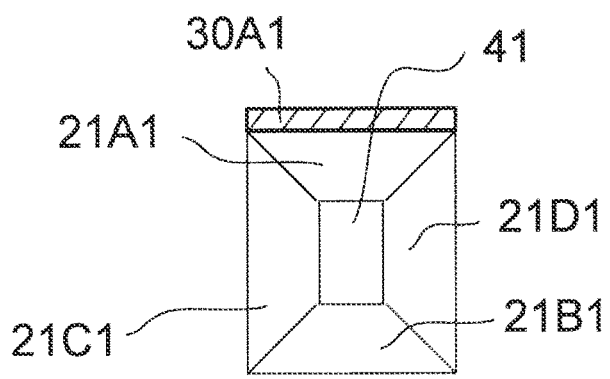

When the activation judging section 26 decides to activate a periphery monitoring alarm, the monitor 36 lights up the display areas 21A1 to 21D1 shown on the display 38 to highlight them as shown in FIG. 6A, and when the activation judging section 34 decides to activate a distant monitoring alarm, the monitor 36 lights up the display area 30A1 shown on the display 38 to highlight it as shown in FIG. 6B.

Furthermore, the monitor 36 wholly highlights the area where an obstacle exists, among the display areas 21A1 to 21D1 and 30A1, for example, by making it flash or shows a mark 42 to identify the obstacle on the display 38 in order to indicate the location of the obstacle from the vehicle.

When the activation judging section 26 decides to activate a periphery monitoring alarm, or even when the activation judging section 34 decides to activate a distant monitoring alarm, if operation of the brake pedal by the operator is confirmed through the vehicle controller 9, the operator has already started action to avoid collision with the obstacle and thus the monitor 36 may be designed to cancel a periphery monitoring alarm or distant monitoring alarm and not give an alarm. If so, unnecessary alarms which need not be given to the operator are suppressed.

Figure 7:
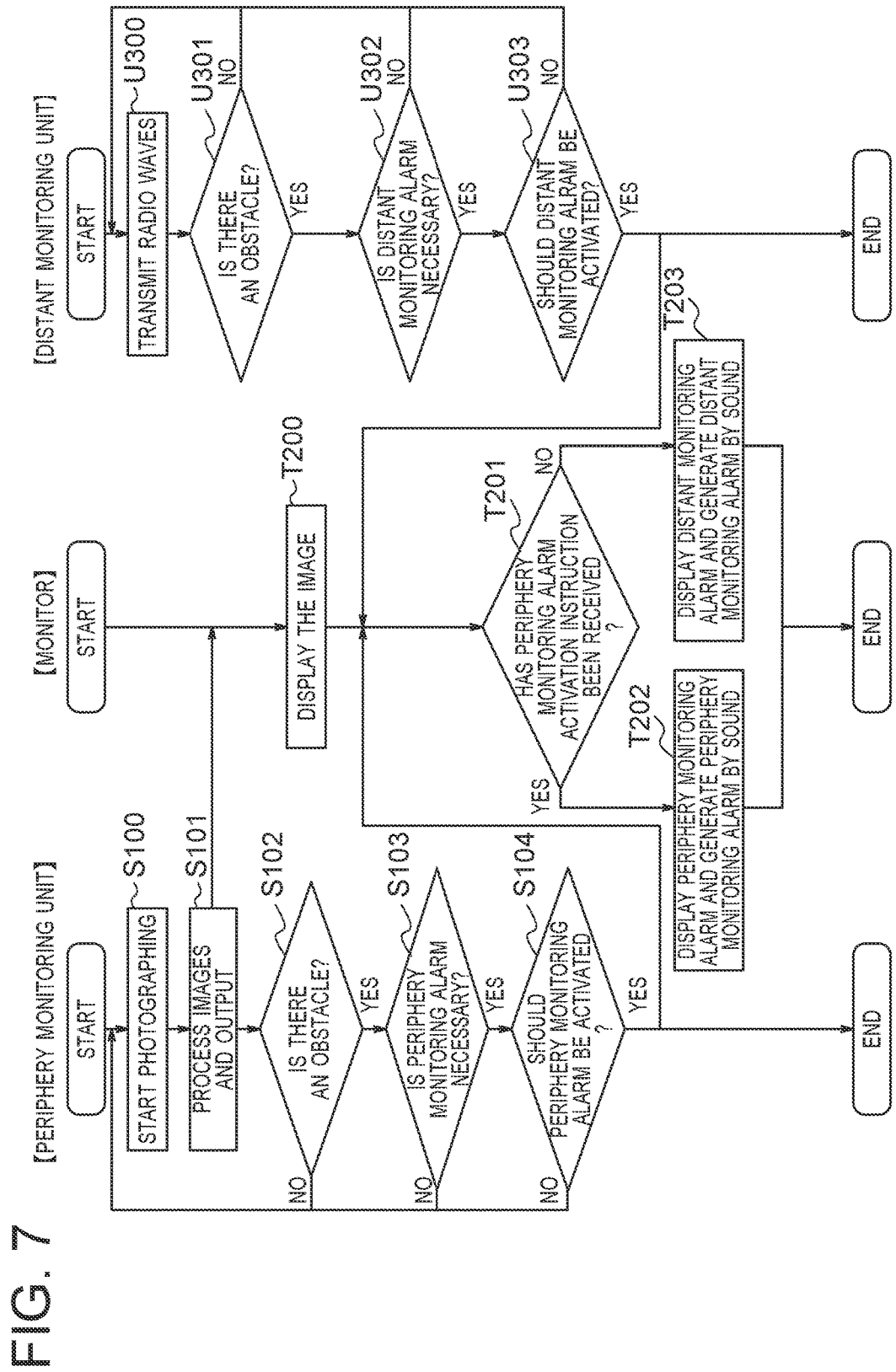
FIG. 7 is a flowchart which explains operation of the obstacle detection device according to the first embodiment of the present invention.

Next, operation of the obstacle detection device 10 according to the first embodiment of the present invention will be described referring to the flowchart of FIG. 7.

When the operator who boards the cab 8 of the dump truck 1 changes the power switch 39 of the monitor 36 from the OFF state to the ON state, the obstacle detection device 10 is activated and the cameras 21a to 21d start photographing and the millimeter wave radar device 30 transmits radio waves and starts to detect an object ahead of the vehicle (S100, U300). When a signal of operation of the shift lever or steering handle, etc. by the operator is entered in the vehicle controller 9, the vehicle controller 9 transmits vehicle information IA including the vehicle speed, shift lever position and steering direction to the alarm judging sections 25 and 33.

Here, operation of the periphery monitoring unit 11 of the obstacle detection device 10 is first described in detail.

When the cameras 21a to 21d start photographing at step S100, the image processing section 23 processes images taken by the cameras 21a to 21d as an overhead-view image and the processed overhead-view image is outputted to the obstacle judging section 24 and the monitor 36 (S101). Then as the obstacle judging section 24 receives the overhead-view image from the image processing section 23, it decides whether or not there is an obstacle around the vehicle, using the received overhead-view image (S102).

If the obstacle judging section 24 decides that there is an obstacle around the vehicle (S102/YES), it measures the relative position and relative speed of the obstacle with respect to the dump truck 1 from the temporal change of raw images taken by the cameras 21a to 21d before integrating them into the overhead-view image and outputs the measurement result to the alarm judging section 25. On the other hand, if the obstacle judging section 24 decides at step S102 that there is no obstacle around the vehicle (S102/NO), the operation from step S100 is repeated.

Next, as the alarm judging section 25 receives the measurement result from the obstacle judging section 24, it receives vehicle information IA from the vehicle controller 9 and judges the possibility of the vehicle colliding with the obstacle from the relative position and relative speed of the obstacle, and the vehicle speed, shift lever position and steering direction in the vehicle information IA and decides whether or not it is necessary to give a periphery monitoring alarm (S103). At this time, if the alarm judging section 25 decides that the vehicle is likely to collide with the obstacle and decides that it is necessary to give a periphery monitoring alarm (S103/YES), it transmits the vehicle information IA to the activation judging section 26. On the other hand, if the alarm judging section 25 decides that the vehicle is unlikely to collide with the obstacle, it decides that it is unnecessary to give a periphery monitoring alarm (S103/NO) and the operation from step S100 is repeated.

As the activation judging section 26 receives the vehicle information IA from the alarm judging section 25, it checks the vehicle speed in the vehicle information IA and decides whether or not to activate a periphery monitoring alarm (S104). At this time, if the activation judging section 26 confirms that the vehicle speed is the prescribed speed or higher, it decides not to activate a periphery monitoring alarm (S104/NO) and the operation from step S100 is repeated. If the activation judging section 26 confirms at step S104 that the vehicle speed is lower than the prescribed speed, it decides to activate a periphery monitoring alarm and transmits an activation instruction to give a periphery monitoring alarm to the monitor 36 (S104/YES) and the operation of the periphery monitoring unit 11 is ended.

Next, operation of the distant monitoring unit 12 of the obstacle detection device 10 will be described in detail.

When the millimeter wave radar device 30 starts to detect an object ahead of the vehicle by transmitting radio waves, the obstacle judging section 32 checks the size of the object detected by the millimeter wave radar device 30 and decides whether or not there is an obstacle in a distant place from the vehicle (U301). Then, if the obstacle judging section 32 decides that there is an obstacle in a distant place from the vehicle (U301/YES), it measures the relative position and relative speed of the obstacle with respect to the dump truck 1 and outputs the measurement result to the alarm judging section 33. If it decides at step U301 that there is no obstacle in a distant place from the vehicle (U301/NO), the operation from step U300 is repeated.

Next, as the alarm judging section 33 receives the measurement result from the obstacle judging section 32, it receives the vehicle information IA from the vehicle controller 9 and judges the possibility of the vehicle colliding with the obstacle from the relative position and relative speed of the obstacle, and the vehicle speed, shift lever position and steering direction in the vehicle information IA and decides whether or not it is necessary to give a distant monitoring alarm (U302). At this time, if the alarm judging section 33 decides that the vehicle is likely to collide with the obstacle and decides that it is necessary to give a distant monitoring alarm (S302/YES), it transmits the vehicle information IA to the activation judging section 34. On the other hand, if the alarm judging section 33 decides that the vehicle is unlikely to collide with the obstacle and decides that it is unnecessary to give a distant monitoring alarm (U302/NO), the operation from step U300 is repeated.

As the activation judging section 34 receives the vehicle information IA from the alarm judging section 33, it checks the vehicle speed of the vehicle information IA and decides whether or not to activate a distant monitoring alarm (U303). At this time, if the activation judging section 34 confirms that the vehicle speed is lower than the prescribed speed, it decides not to activate a distant monitoring alarm (U303/NO) and the operation from step U300 is repeated. If the activation judging section 34 confirms at step U304 that the vehicle speed is the prescribed speed or higher, it decides to activate a distant monitoring alarm and transmits an activation instruction to give a distant monitoring alarm to the monitor 36 (S303/YES) and the operation of the distant monitoring unit 12 is ended.

Next, operation of the monitor 36 of the obstacle detection device 10 will be described in detail.

After operation of the periphery monitoring unit 11 for step S101 is performed, the monitor 36 receives the overhead-view image from the image processing section 23 and shows the overhead-view image on the display 38 (T200). Next, after operation of the periphery monitoring unit 11 for step S104 and operation of the distant monitoring unit 12 for step U303 are performed, the monitor 36 decides whether or not it has received an activation instruction from the activation judging section 26 of the periphery monitoring unit 11 (T201).

At this time, if the monitor 36 decides that it has received an activation instruction from the activation judging section 26 of the periphery monitoring unit 11 (T201/YES), for example, it lights up the photographing range 21A1 to 21D1 for the overhead-view image shown on the display 38 and generates a periphery monitoring alarm by sound from the speaker 37 (T202) and the operation of the monitor 36 is ended. On the other hand, if the monitor 36 decides that it has not received an activation instruction from the activation judging section 26 of the periphery monitoring unit 11, namely it has received an activation instruction from the activation judging section 34 of the distant monitoring unit 12 (T201/NO), for example, the monitor 36 lights up the detection range 30A1 for the overhead-view image shown on the display 38 and generates a distant monitoring alarm by sound from the speaker 37 (T203) and the operation of the monitor 36 is ended.

According to the obstacle detection device 10 thus configured according to the first embodiment of the present invention, two different monitoring functions, which are monitoring of the periphery of the vehicle by the periphery monitoring unit 11 using the cameras 21a to 21d and monitoring of a distant area from the vehicle by the distant monitoring unit 12 using the millimeter wave radar device 30, are provided.

Therefore, the activation judging sections 26, 34 of the periphery monitoring controller 22 and distant monitoring controller 31 switch ON or OFF these monitoring functions as appropriate depending on vehicle speed so that monitoring suitable for the travel condition of the vehicle can be performed. In other words, monitoring is not performed using all of the cameras 21a to 21d and the millimeter wave radar device 30 at the same time, thereby suppressing the possibility that erroneous operation that a land surface irregularity which is not an obstacle is detected as an obstacle occurs or unnecessary operation to detect an obstacle unlikely to cause collision occurs due to the activation of the two different monitoring functions. Consequently, an obstacle coming close to the vehicle can be accurately detected regardless of vehicle speed, so high reliability is achieved.

In addition, when the vehicle speed is a prescribed speed or higher, as shown in FIG. 3, the obstacle detection device 10 according to the first embodiment of the present invention can grasp an obstacle likely to collide with the dump truck 1, such as an oncoming vehicle, at an early stage by monitoring ahead of the vehicle using the millimeter wave radar device 30 whose detection range 30A from the vehicle is longer than the photographing range 21A of the camera 21a. For this reason, when the operator confirms a distant monitoring alarm on the monitor 36, the operator can have plenty time to deal with the obstacle approaching with the travel of the vehicle, by decelerating the vehicle or changing the vehicle traveling direction, etc.

On the other hand, when the vehicle speed is lower than the prescribed speed, the existence of an obstacle around the vehicle can be grasped adequately by monitoring the area around the vehicle using the cameras 21a to 21d. Therefore, when the operator confirms a periphery monitoring alarm on the monitor 36, the operator can easily know the location of the obstacle from the overhead-view image mark 42 shown on the display 38 of the monitor 36 as shown in FIG. 6A and can drive the vehicle safely so as to avoid contact with the obstacle. Especially, though the operator cannot always continue to monitor the display 38 of the monitor 36 while driving the dump truck 1, the operator can easily notice the existence of an obstacle coming close to the vehicle when a periphery monitoring alarm or distant monitoring alarm is transmitted as an audio alarm from the speaker 37.

Second Embodiment

Figure 8:
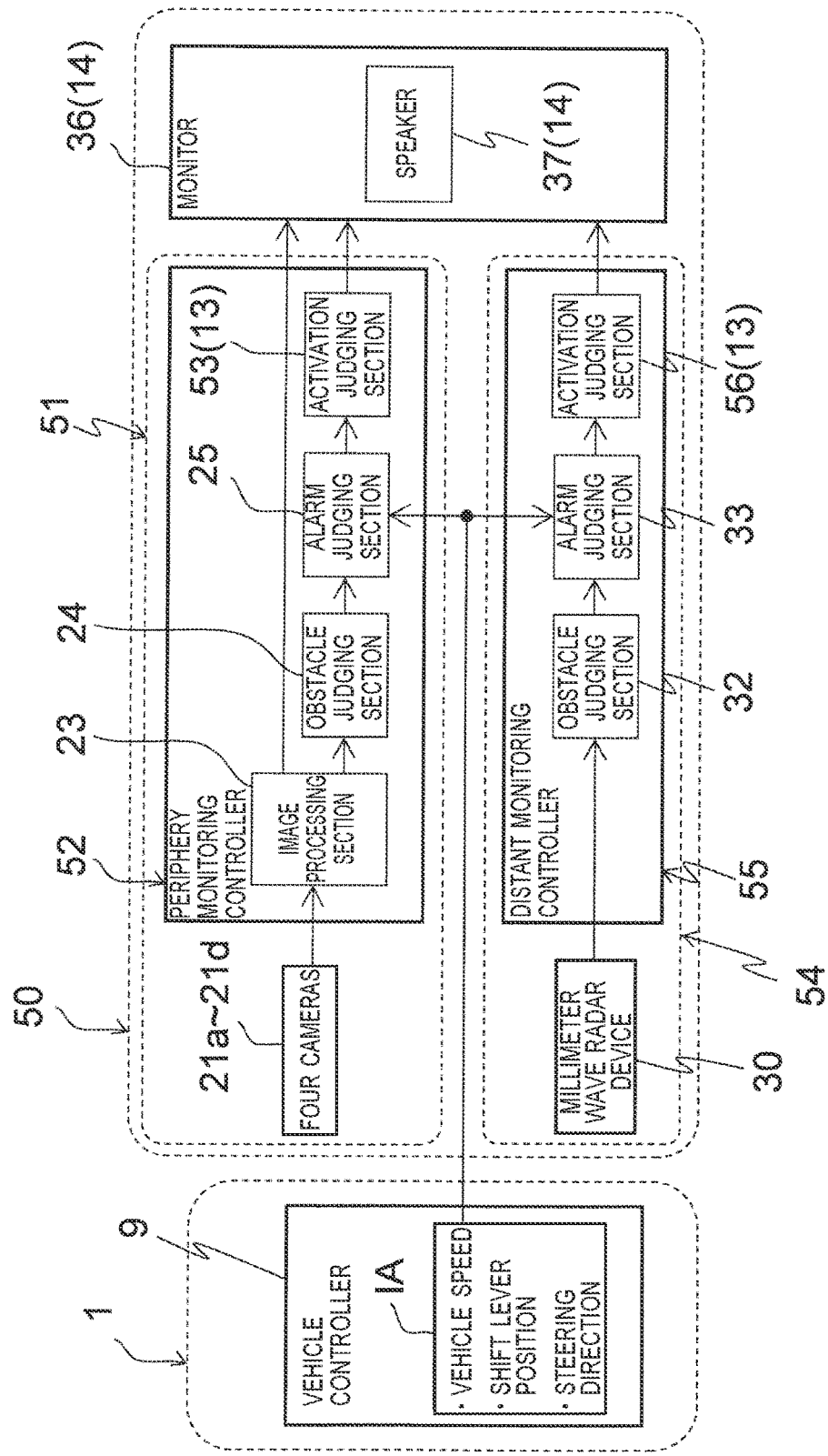
FIG. 8 is a block diagram which explains the configurations of the obstacle detection device and vehicle controller according to a second embodiment of the present invention.

In addition to the above configuration of the first embodiment, as shown in FIG. 8, an obstacle detection device 50 according to the second embodiment of the present invention is configured so that when the vehicle is accelerated and the vehicle speed reaches the prescribed speed and the vehicle traveling direction is a given direction among the forward, backward, left and right directions of the vehicle, the activation judging sections 53, 56 of the periphery monitoring controller 52 and distant monitoring controller 55 switch to monitoring by the distant monitoring unit 54 and also activate some of the cameras 21a to 21d and keep partial monitoring by the periphery monitoring unit 51.

Specifically, for example, if the vehicle is accelerated and the vehicle speed reaches the prescribed speed and the vehicle traveling direction is the forward direction, the activation judging section 53 decides not to activate a periphery monitoring alarm and the activation judging section 56 decides to activate a distant monitoring alarm to switch to monitoring by the distant monitoring unit 54, and the periphery monitoring unit 51 decides to activate, among the cameras 21a to 21d, the cameras 21b to 21c for photographing in the backward, left and right directions of the vehicle to activate an alarm (hereinafter called a periphery partial monitoring alarm, for convenience) that an obstacle exists backward, left and right in the area around the vehicle, thereby keeping partial monitoring by the periphery monitoring unit 51.

Specifically, as shown in FIG. 9A, when the vehicle travel state is the state of forward travel at the prescribed speed or higher (forward high speed travel state), among the monitoring functions of the periphery monitoring unit 51 the forward monitoring function is OFF, the backward, left and right monitoring functions are ON and the monitoring function of the distant monitoring unit 54 is ON and when the vehicle travel state is the state of forward travel at a lower speed than the prescribed speed (forward low speed travel state), the monitoring functions of the periphery monitoring unit 51 are ON and the monitoring function of the distant monitoring unit 54 is OFF. When the vehicle travel state is the state in which the vehicle stops (stop state), the monitoring functions of the periphery monitoring unit 51 are ON and the monitoring function of the distant monitoring unit 54 is OFF and when the vehicle travel state is the state in which the vehicle moves backward (backward travel state), the monitoring functions of the periphery monitoring unit 51 are ON and the monitoring function of the distant monitoring unit 54 is OFF.

Also, regarding the activation judging sections 53, 56, for example, if the vehicle is accelerated and the vehicle speed reaches the prescribed speed and the vehicle traveling direction is the left or right direction, the activation judging section 53 decides not to activate a periphery monitoring alarm and the activation judging section 56 decides to activate a distant monitoring alarm to switch to monitoring by the distant monitoring unit 54, and it is decided that among the cameras 21a to 21d, the cameras for photographing in the backward and left directions or backward and right directions of the vehicle are activated to activate an alarm (hereinafter called a periphery partial monitoring alarm, for convenience as mentioned above) that an obstacle exists backward and left or backward and right in the area around the vehicle, thereby keeping partial monitoring by the periphery monitoring unit 51.

In other words, as shown in FIG. 9B, when the vehicle travel state is the state of left travel at the prescribed speed or higher (left high speed travel state), among the monitoring functions of the periphery monitoring unit 51 the forward and right monitoring functions are OFF and the backward and left monitoring functions are ON and the monitoring function of the distant monitoring unit 54 is ON; and when the vehicle is in the state of right travel at the prescribed speed or higher (right high speed travel state), among the monitoring functions of the periphery monitoring unit 51 the forward and left monitoring functions are OFF and the backward and right monitoring functions are ON and the monitoring function of the distant monitoring unit 54 is ON. The other elements of the obstacle detection device 50 are the same as the obstacle detection device 10 according to the first embodiment and descriptions of the same elements are omitted and the same elements as in the obstacle detection device 10 are designated by the same reference signs.

Figure 10:
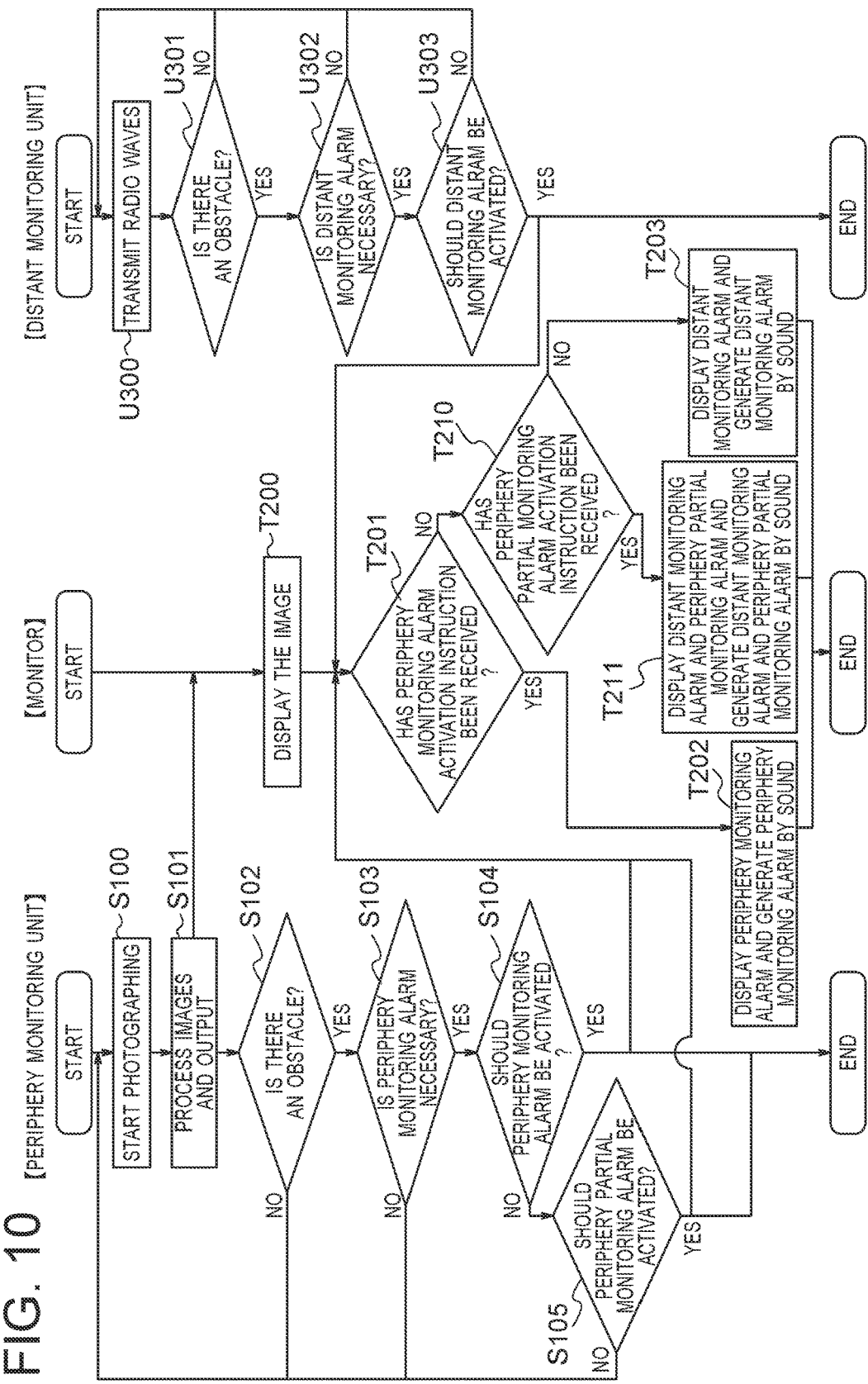
FIG. 10 is a flowchart which explains operation of the obstacle detection device according to the second embodiment of the present invention.

Next, operation of the obstacle detection device 50 according to the second embodiment of the present invention will be described referring to the flowchart of FIG. 10 and steps S100 to S104, T200 to T203, and U300 to U303 are the same as those for the obstacle detection device 10 and descriptions of the same steps are omitted and only different steps from the operation of the obstacle detection device 10 are described.

First, operation of the periphery monitoring unit 51 of the obstacle detection device 50 will be described in detail.

If at step S104 the activation judging section 53 decides not to activate a periphery monitoring alarm (S104/NO), it checks the shift lever position and steering direction in the vehicle information IA and decides whether or not to activate a periphery partial monitoring alarm (S105). At this time, if the activation judging section 53 decides not to activate a periphery partial monitoring alarm (S105/NO), the operation from step S100 is repeated. On the other hand, if at step S105 the activation judging section 53 decides to activate a periphery partial monitoring alarm, it transmits an activation instruction to give a periphery partial monitoring alarm to the monitor 36 (S105/YES) and then operation of the periphery monitoring unit 51 is ended.

Next, operation of the monitor 36 of the obstacle detection device 50 will be described in detail.

If the monitor 36 decides at step T201 that it has not received an activation instruction from the activation judging section 53 of the periphery monitoring unit 51 (T201/NO), it decides whether or not it has received an activation instruction for a periphery partial monitoring alarm from the activation judging section 53 of the periphery monitoring unit 51 (T210). At this time, if the monitor 36 decides that it has not received an activation instruction for a periphery partial monitoring alarm from the activation judging section 53, namely if it decides that it has received an activation instruction from the activation judging section 56 of the distant monitoring unit 54 (T210/NO), operation for step T203 is performed and operation of the monitor 36 is ended.

On the other hand, if the monitor 36 decides that it has received an activation instruction for a periphery partial monitoring alarm from the activation judging section 53 (T210/YES), for example, it lights up an area for which a monitoring function is effective, among the display areas 21A1 to 21D1, 30A1 for the overhead-view image shown on the display 38 and generates a distant monitoring alarm and a periphery partial monitoring alarm by sound from the speaker 37 and the operation of the monitor 36 is ended.

According to the obstacle detection device 50 thus configured according to the second embodiment of the present invention, the same effects as the obstacle detection device 10 according to the first embodiment are brought about and furthermore, when the vehicle speed is the prescribed speed or higher and the vehicle traveling direction is the forward direction of the vehicle, an area ahead of the vehicle is monitored using the millimeter wave radar device 30 whose detection range 30A from the vehicle is longer than the photographing range 21A of the camera 21a and also the cameras 21b to 21d take photos of the ranges 21B to 21D which tend to become blind spots in the vehicle traveling direction, so that monitoring is performed in other directions than the forward direction in the area around the vehicle. Therefore, if there is a vehicle trying to pass from behind the dump truck 1, when the vehicle trying to pass enters the photographing range 21B to 21D, a periphery partial monitoring alarm is given so that the operator can easily notice not only an approaching obstacle ahead of the vehicle but also the vehicle trying to pass.

In addition, in the obstacle detection device 50 according to the second embodiment of the present invention, when the vehicle speed is the prescribed speed or higher and the vehicle traveling direction is the left or right direction of the vehicle, an area ahead of the vehicle is monitored using the millimeter wave radar device 30 whose detection range 30A from the vehicle is longer than the photographing range 21A of the camera 21a and also the cameras 21b to 21d take photos of the ranges 21B to 21D including the same direction as the vehicle traveling direction for monitoring. Therefore, when the operator changes the vehicle traveling direction to the left or right by operating the steering handle, the operator who is steering can be forced to pay attention to an obstacle left or right of the vehicle and can avoid collision between the vehicle and the obstacle adequately.

Third Embodiment

Figure 11:
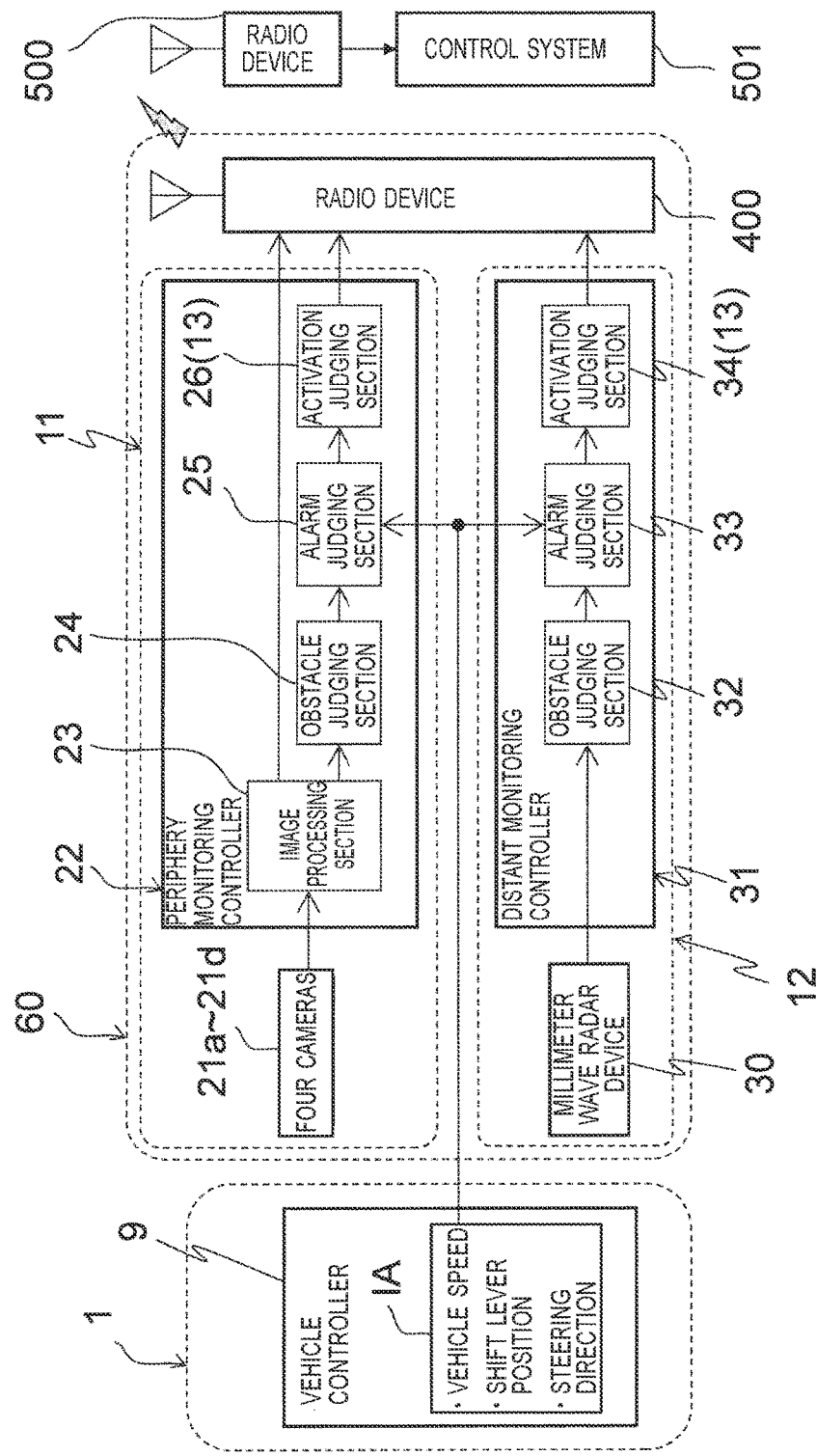
FIG. 11 is a block diagram which explains the configurations of the obstacle detection device and vehicle controller according to a third embodiment of the present invention.

An obstacle detection device 60 according to the third embodiment of the present invention is equipped with a radio device 400 which transmits the results of monitoring by the periphery monitoring unit 11 and distant monitoring unit 12 to the outside, for example as shown in FIG. 11, instead of the monitor 36 and speaker 37 as the reporting unit 14 of the obstacle detection device 10 according to the first embodiment. In this case, the monitoring result transmitted by the radio device 400 is conveyed to a radio device 500 of a control system 501 for monitoring the state of the dump truck 1 remotely and controlled inside the control system 501. The other elements of the obstacle detection device 60 are the same as the obstacle detection device 10 according to the first embodiment and descriptions of the same elements are omitted and the same elements as in the obstacle detection device 10 are designated by the same reference signs.

According to the obstacle detection device 60 thus configured according to the third embodiment of the present invention, the same effects as the obstacle detection device 10 according to the first embodiment are brought about and furthermore, by giving an instruction from the control system 501 to the operator of the dump truck 1 or if the dump truck 1 operates as an unmanned vehicle, giving a control instruction to the vehicle controller 9 through the radio devices 400, 500, collision between the vehicle and an obstacle can be avoided adequately. Consequently a reliable monitoring system against an obstacle coming close to the vehicle can be established.

Furthermore, by using, for example, a vehicle identification number or obstacle detection result as the result of monitoring by the periphery monitoring unit 11 and distant monitoring unit 12 transmitted by the radio device 400, the amount of data transmitted can be decreased and thus the burden on communications between the obstacle detection device 60 and the control system 501 can be reduced. The communication method is not limited to wireless communications by the above radio devices 400, 500 if the environment enables communications between the obstacle detection device 60 and the control system 501.

Fourth Embodiment

Figure 12:
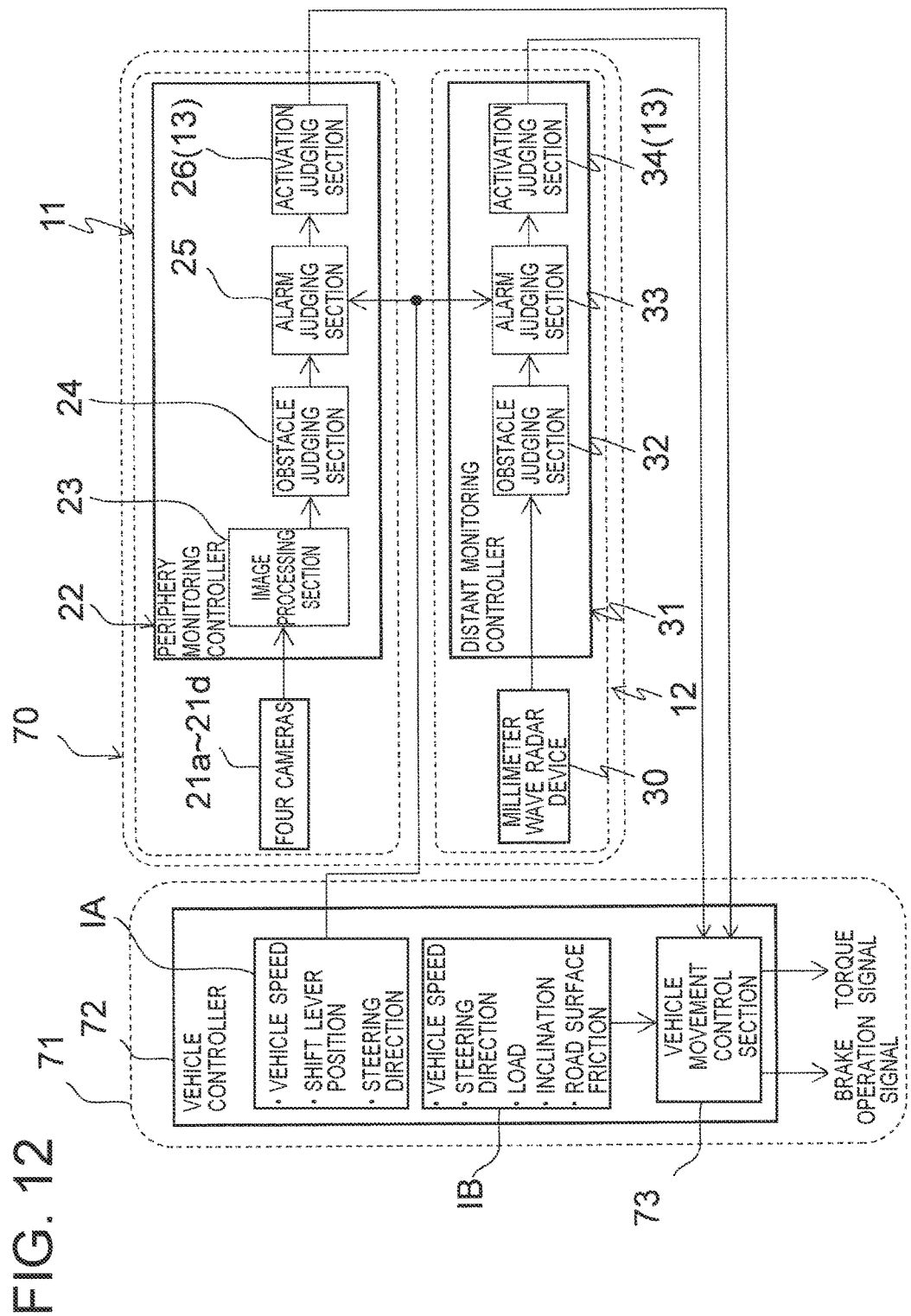
FIG. 12 a block diagram which explains the configurations of the obstacle detection device and vehicle controller according to a fourth embodiment of the present invention.

An obstacle detection device 70 according to the fourth embodiment of the present invention is configured so as to feed back the results of monitoring by the periphery monitoring unit 11 and distant monitoring unit 12 to a vehicle controller 72, for example as shown in FIG. 12, instead of the monitor 36 and speaker 37 as the reporting unit 14 of the obstacle detection device 10 according to the first embodiment.

Specifically, a dump truck 71 includes a load measuring sensor for measuring the load in the vessel 2, an inclination measuring sensor for measuring the inclination of the road surface on which the vehicle runs, and a road surface friction measuring sensor which measures the road surface friction between the front wheels 6 and rear wheels 7 and the road surface. The vehicle controller 72 receives vehicle information IB including the load measured by the load measuring sensor, the inclination measured by the inclination measuring sensor, and the road surface friction measured by the road surface friction measuring sensor as well as the vehicle speed and steering direction.

The vehicle controller 72 includes a vehicle movement control section 73 which controls the movement of the vehicle depending on the judgement results of the activation judging sections 26, 34 of the periphery monitoring unit 11 and distant monitoring unit 12 and the vehicle information IB. For example, if the activation judging section 26 decides to activate a periphery monitoring alarm or the activation judging section 34 decides to activate a distant monitoring alarm, the vehicle movement control section 73 outputs a brake operation signal to force braking according to the fed-back relative position and relative speed of the obstacle and the vehicle speed, steering direction, load, inclination, and road surface friction in the received vehicle information IB or controls a torque signal to be outputted to the motor (not shown) which rotates the rear wheels 7. In other words, since the braking performance of the brake can be grasped from the load, inclination, and road surface friction, the torque signal output value can be set appropriately by measuring the braking distance upon application of the brake.

According to the obstacle detection device 70 thus configured according to the fourth embodiment of the present invention, the same effects as the obstacle detection device 10 according to the first embodiment are brought about and furthermore, when the activation judging section 26 decides to activate a periphery monitoring alarm or the activation judging section 34 decides to activate a distant monitoring alarm, the vehicle movement control section 73 applies a braking force to the rear wheels 7 so that the vehicle can be stopped quickly regardless of operation of the brake pedal by the operator. Since the dump truck 71 can automatically move to avoid collision with an obstacle in this way, the responsiveness from when a periphery monitoring alarm or distant monitoring alarm is activated until the rear wheels 7 are braked can be enhanced.

The obstacle detection devices 10, 50, 60, and 70 according to the first to fourth embodiments of the present invention have been so far explained on the assumption that the periphery monitoring units 11 and 51 have four cameras 21a to 21d for photographing the area around the vehicle; however, the number of cameras is not limited thereto but it may be changed as appropriate. Also, in order to detect an obstacle around the vehicle, instead of the cameras 21a to 21d, for example, a near-range millimeter wave radar, quasi-millimeter wave radar or laser may be used or a combination of cameras and sensors may be used to monitor the area around the vehicle.

Furthermore, the obstacle detection devices 10, 50, 60, and 70 according to the first to fourth embodiments of the present invention have been explained on the assumption that the distant monitoring units 12 and 54 have a millimeter wave radar device 30 for detecting an object ahead of the vehicle, but the number of millimeter wave radar devices 30 is not limited thereto but it may be changed as appropriate. For example, by increasing the number of millimeter wave radar devices. 30, the monitoring range of the distant monitoring unit 12 can be widened. In this case, the display areas on the display 38 of the monitor 36 are set as appropriate depending on the number of millimeter wave radar devices 30. In addition, in order to detect an obstacle in a distant place from the vehicle, for example, a camera or laser may be used instead of the millimeter wave radar device 30.

The obstacle detection devices 10, 50, 60, and 70 according to the first to fourth embodiments of the present invention have been explained on the assumption that the reporting unit 14 includes a monitor 36 for displaying a periphery monitoring alarm and a distant monitoring alarm and a speaker 37 for generating a periphery monitoring alarm and a distant monitoring alarm by sound, but instead the reporting unit 14 may only include an audio alarm device such as a speaker 37 or buzzer. Furthermore, the operator who operates the dump truck 1, 71 can be alerted stepwise by changing the sound quality or sound volume of the alarm device depending on the location of an obstacle coming close to the vehicle or the possibility of collision between the vehicle and obstacle, so an excellent monitoring performance can be achieved.

REFERENCE SIGNS LIST 1, 71 dump truck,
2 vessel,
6 front wheel,
7 rear wheel,
9, 72 vehicle controller,
10, 50, 60, 70 obstacle detection device,
11, 51 periphery monitoring unit,
12, 54 distant monitoring unit,
13 monitoring switching unit,
21a to 21d camera
22, 52 periphery monitoring controller,
23 image processing section,
24, 32 obstacle judging section,
25, 33 alarm judging section,
26, 34, 53, 56 activation judging section (monitoring switching unit),
30 millimeter wave radar device,
31, 55 distant monitoring controller,
36 monitor (reporting unit),
37 speaker (reporting unit),
38 display,
73 vehicle movement control section,
400, 500 radio device,
501 control system

The invention claimed is:

1. An obstacle detection device for a work machine which detects an obstacle, comprising:
a first controller configured to detect the obstacle in a first area around the vehicle and monitor the first area around the vehicle;
a second controller configured to detect an obstacle in a distant area that is more distant from the vehicle than the first area and monitor the distant area from the vehicle; and
a third controller configured to control operations of the vehicle;
a plurality of periphery monitoring cameras disposed on the vehicle and connected to the first controller that provide different photographing ranges to photograph the first area around the vehicle;
a millimeter wave radar disposed on the vehicle and connected to the second controller and having a detection range from the vehicle longer than the respective photographing ranges of the plurality of periphery monitoring cameras;
a vehicle speed sensor configured to detect a speed of the vehicle, a shift lever configured to switch to one of a forward, neutral, and reverse gear in a running state of the vehicle, and a steering handle configured to change a steering direction of the vehicle in a leftward direction or a rightward direction are connected to the vehicle controller, wherein the speed of the vehicle, a switching position of the shift lever and the steering direction are input to the third controller as vehicle information,
wherein the second controller is configured to:
determine whether to issue an alarm that an obstacle is present in the distant area from the vehicle based on a detection result of the millimeter wave radar and the vehicle information input to the third controller, and
activate the alarm that the obstacle is present in the distant area from the vehicle upon determining to issue the alarm that the obstacle is present in the distant area from the vehicle and upon determining that the vehicle is accelerated and the speed of the vehicle reaches a predetermined speed, and a traveling direction of the vehicle is a given direction among the forward, backward, left and right directions of the vehicle based on the vehicle information input to the third controller,
wherein the first controller is configured to:
determine whether to issue an alarm that an obstacle is present at the first area around the vehicle based on photograph information taken by the plurality of periphery monitoring cameras and the vehicle information inputted to the third controller, and
activate the alarm that the obstacle is present at the first area around the vehicle if determining to issue the alarm that the obstacle is present at the first area around the vehicle, and upon determining that the vehicle is decelerated and the speed of the vehicle becomes lower than the predetermined speed based on the vehicle information input to the third controller, and
wherein when the speed of the vehicle is equal to or higher than the predetermined speed, and a traveling direction of the vehicle is the given direction among the forward, backward, left and right directions of the vehicle, the first controller is configured to activate at least one camera among the plurality of periphery monitoring cameras other than a camera having a photographing range in the given direction and to activate an alarm upon determining that an obstacle is present in the first area around the vehicle based on the photographs taken by the at least one activated camera and the vehicle information.

2. The obstacle detection device for the work machine according to claim 1, wherein the given direction is the forward direction, and the at least one activated camera among the plurality of periphery monitoring cameras includes a camera having a photographing range in a backward direction of the vehicle.

3. The obstacle detection device for the work machine according to claim 1, wherein the given direction is the left or right direction and the at least one activated camera among the plurality of periphery monitoring cameras includes either a camera having an photographing range on a right side of the vehicle if the given direction is the left direction or a camera having an photographing range on a left side of the vehicle if the given direction is the right direction.

* * * * *